(12) United States Patent
Candebat

(10) Patent No.: US 9,812,138 B1
(45) Date of Patent: Nov. 7, 2017

(54) PROVING FILE OWNERSHIP

(71) Applicant: Amazon Technologies, Inc., Reno, NV (US)

(72) Inventor: Thibault Candebat, Saint Germain en Laye (FR)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/476,615

(22) Filed: Sep. 3, 2014

(51) Int. Cl.
*G10L 19/018* (2013.01)

(52) U.S. Cl.
CPC .................................. *G10L 19/018* (2013.01)

(58) Field of Classification Search
None
See application file for complete search history.

(56) References Cited

U.S. PATENT DOCUMENTS

| | | | | |
|---|---|---|---|---|
| 7,124,302 B2 * | 10/2006 | Ginter | ...................... | G06F 21/10 380/279 |
| 7,269,734 B1 * | 9/2007 | Johnson | ................. | G06T 1/0021 375/E7.026 |
| 7,287,166 B1 * | 10/2007 | Chang | ...................... | G06F 21/54 713/176 |
| 8,838,978 B2 * | 9/2014 | Winograd | ............... | G06F 21/10 713/176 |
| 9,153,006 B2 * | 10/2015 | Petrovic | ................. | G06T 1/0028 |
| 2002/0038296 A1 * | 3/2002 | Margolus | .......... | G06F 17/30097 |
| 2002/0062252 A1 * | 5/2002 | Van Zoest | .......... | G06Q 30/0225 705/14.26 |
| 2004/0009763 A1 * | 1/2004 | Stone | ................. | H04N 21/8358 455/410 |
| 2005/0042983 A1 * | 2/2005 | Borgward | ............... | G06F 21/10 455/3.06 |
| 2006/0036548 A1 * | 2/2006 | Roever | .................... | G06F 21/10 705/51 |
| 2007/0130015 A1 * | 6/2007 | Starr | ...................... | G06Q 30/02 705/14.46 |
| 2007/0180537 A1 * | 8/2007 | He | .......................... | G06F 21/10 726/32 |
| 2008/0270307 A1 * | 10/2008 | Olson | ..................... | G06F 21/10 705/51 |
| 2009/0029685 A1 * | 1/2009 | Willis | ..................... | H04L 67/04 455/414.1 |
| 2009/0063867 A1 * | 3/2009 | Granados | .............. | G06F 21/125 713/187 |
| 2009/0097769 A1 * | 4/2009 | Velasquez | ............. | G06F 17/243 382/249 |
| 2009/0286560 A1 * | 11/2009 | Willis | ............... | G06F 17/30017 455/466 |

(Continued)

*Primary Examiner* — Paras D Shah
*Assistant Examiner* — Jonathan Kim
(74) *Attorney, Agent, or Firm* — Davis Wright Tremaine LLP

(57) ABSTRACT

A robust digital fingerprint of a file ensures that one able to produce the robust digital fingerprint has possession of the file. A client obtains information that is unpredictable to the client and uses that information to modify the file and generate a robust digital fingerprint from the modified file. A server, with access to the same unpredictable information, verifies the generated robust digital fingerprint. An algorithm for generating the robust digital fingerprint has a property that different representations of the same content will produce matching digital fingerprints.

20 Claims, 8 Drawing Sheets

(56) References Cited

U.S. PATENT DOCUMENTS

| | | | |
|---|---|---|---|
| 2011/0167254 A1* | 7/2011 | Dagdeviren | G06F 21/10 |
| | | | 713/150 |
| 2011/0191577 A1* | 8/2011 | Tian | H04L 9/00 |
| | | | 713/150 |
| 2012/0042162 A1* | 2/2012 | Anglin | G06F 21/57 |
| | | | 713/165 |
| 2012/0272336 A1* | 10/2012 | Cohen | G06F 21/10 |
| | | | 726/28 |
| 2013/0212691 A1* | 8/2013 | Chatfield | G06Q 20/1235 |
| | | | 726/26 |
| 2014/0195026 A1* | 7/2014 | Wieder | H04L 67/306 |
| | | | 700/94 |
| 2014/0201164 A1* | 7/2014 | Skinder | G06F 21/6218 |
| | | | 707/687 |
| 2015/0100883 A1* | 4/2015 | Kern | H04L 65/60 |
| | | | 715/716 |
| 2015/0170660 A1* | 6/2015 | Han | G10L 19/018 |
| | | | 700/94 |
| 2015/0205938 A1* | 7/2015 | Dagdeviren | G06F 21/10 |
| | | | 726/26 |
| 2017/0005788 A1* | 1/2017 | Irvine | G06F 21/6218 |

* cited by examiner

PROVING FILE OWNERSHIP

BACKGROUND

With the growing popularity of digital music and other media, various services have emerged accordingly. In the past, media enjoyment generally required a broadcast station or physical possession of a media file, such as on a vinyl record, cassette tape, compact disk, hard drive or other such medium. Various services, however, have emerged where media is provided as a service to provide substantial variety in how media is consumed. Users, for example, are able to stream media to mobile and other devices without those devices needing to store a local copy of the media. Some services are configured to act as extensions of users' personal media libraries. For example, some services are configured to allow users to prove ownership of media files to obtain access to additional services in connection with those media files. A user may, for instance, prove ownership of a media file to gain the ability to stream that media file from a server to a device, thereby removing the need to have a local copy of the media file present to enjoy the media file.

Conventional techniques for proving ownership of media files, however, have numerous drawbacks. For instance, some techniques for proving ownership of media files utilize information generated from the audio files as proof of ownership. Such information, however, is often easily transferable to other users who may present the information without having the audio files themselves. As another example, media files encoding the same media may vary greatly. The same music track, for instance, may be encoded at different bitrates, resulting in different information being stored and, consequently, information generated from the media file (e.g., a hash) to vary among different copies of the same media. Even information outside of the media itself (e.g., metadata) may cause different information to be generated for different copies of the same media.

BRIEF DESCRIPTION OF THE DRAWINGS

Various embodiments in accordance with the present disclosure will be described with reference to the drawings, in which.

DETAILED DESCRIPTION

Figure 1:
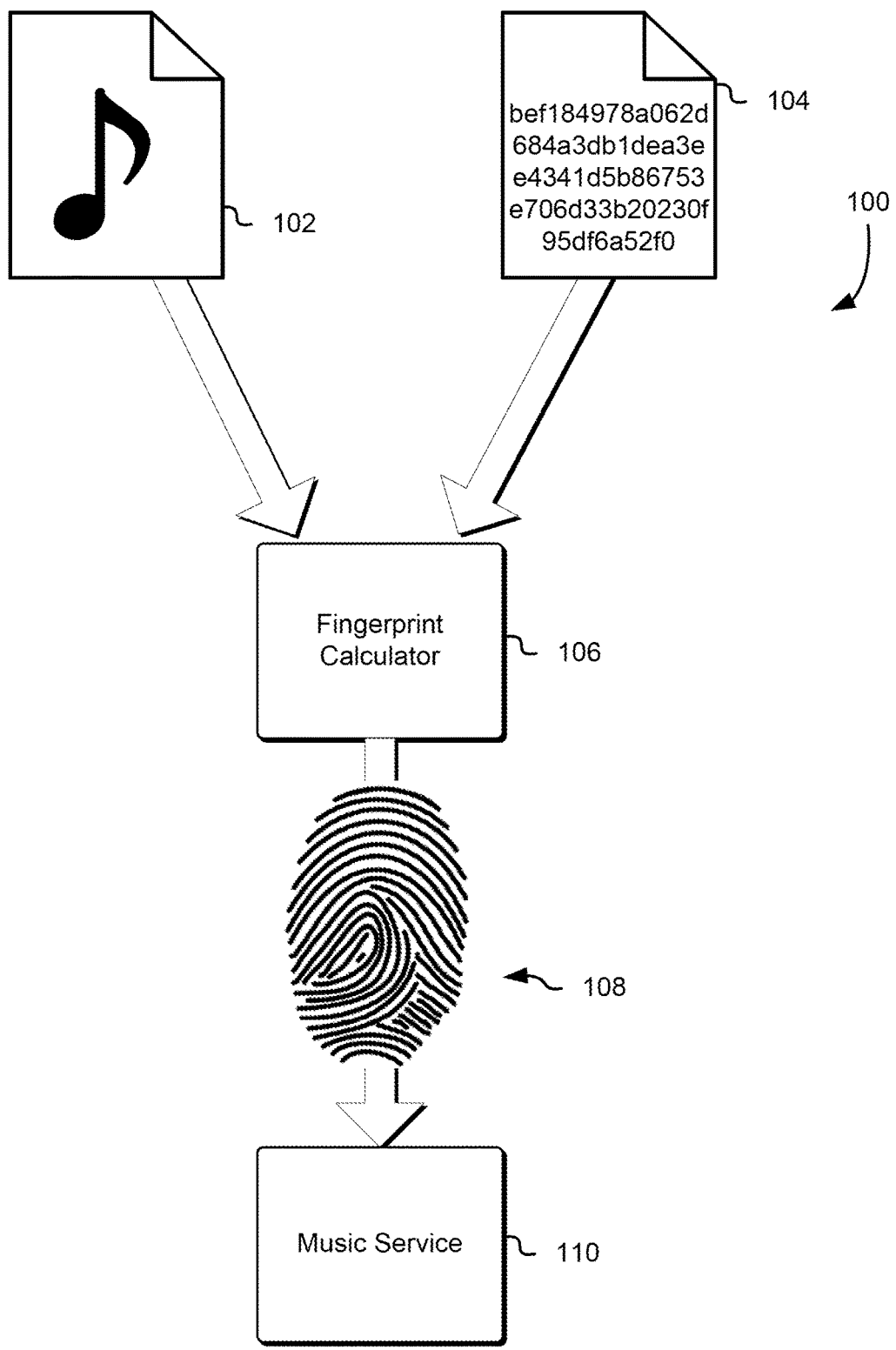
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for securely proving ownership of audio and other files. In an embodiment, a service provider enables a customer to prove ownership of audio files by first providing a random number or information that is unpredictable to the customer. The customer may segment a media file to generate an ordered plurality of segments. For example, the audio file may be segmented into one-second portions of the audio file. The customer may then use the random number to determine a permutation of the segments. The permutation may be determined in a manner resulting in the properties that different random numbers result in different permutations and the customer cannot determine the permutation without the random number.

Once the permutation has been determined, the customer may apply the permutation to the ordered plurality of segments, thereby obtaining another ordered plurality of segments. The other ordered plurality of segments may then be used to construct another version of the audio portion of the audio file. An audio fingerprinting algorithm may be used to analyze the constructed other version of the audio portion of the file to determine an audio fingerprint of the audio. The audio fingerprinting algorithm may be configured to be unaffected by small variations that may occur in different copies of the audio. For example, the audio fingerprinting algorithm may utilize spectral analysis and be configured such that small variations in the audio file do not affect the resulting audio fingerprints. As an illustrative example, the audio fingerprinting algorithm may be configured such that, for a range of bitrates, audio recorded at different bitrates will result in the same audio fingerprint regardless of bitrate.

The customer may provide the audio fingerprint to the server to assert ownership of the corresponding audio file. The service provider, having recorded the random number, may access its own copy of the audio file, segment the audio portion of the audio file, reconstruct the segments to generate other audio, and compute an audio fingerprint of the reconstructed other audio in the same manner as computed by the customer. The service provider may then compare the audio fingerprint it generated itself with the audio fingerprint provided by the customer to determine if there is a match (e.g., if the two audio fingerprints are the same). If the service provider determines that there is a match, the service provider may enable consumption of one or more services in connection with the audio file. For instance, the service provider may enable the customer to stream the audio file to allow the customer to listen to the audio without having a local copy of the audio stored.

Numerous variations are considered as being within the scope of the present disclosure. For example, some audio fingerprinting algorithms include segmentation of audio. The segmentation of the audio may be performed so that the segments may be used for performance of an audio fingerprinting algorithm. In other words, the segments determined by performance of the audio fingerprinting algorithm may be permuted using the random number as part of the algorithm itself. In this manner, efficiency is gained as a single segmentation may be used both to permute the audio segments and to determine the fingerprints, obviating the need to determine an additional segmentation. As another example, the random number may also be used to combine the audio fingerprinting with additional operations, thereby creating a synergistic effect. As an illustrative example, the random number may be used to determine what information a customer provides as part of authentication for a system that utilizes the audio fingerprint. A user may have, for example, numerous possibilities of information to be provided for authentication and the random number may enable selection of some of the information usable for authentication. Other variations, some of which are described below, are also considered as being within the scope of the present disclosure.

FIG. 1 shows a diagram 100 illustrating various aspects of the present disclosure. As shown in FIG. 1 a music file 102 is combined with random information 104 and input into a fingerprint calculator 106. The music file 102 may be, for example, an MP3 file or other encoding of digital music. Further, while the present disclosure uses music files for the purpose of illustration, and as discussed in more detail below, the techniques described herein are applicable to other types of information, including other types of media files and other encodings of content. The fingerprint calculator 106 may be a programming module configured to cause a computer system executing the programming module to utilize the music file 102 and the random information 104 to generate an acoustic fingerprint 108 (also referred to as simply a "fingerprint") of the music file 102.

The fingerprint calculator 106 may utilize a fingerprinting algorithm such as noted above and discussed in more detail below to generate the fingerprint 108. Examples of fingerprinting algorithms include, but are not limited to, algorithms utilized by All Media Guide's LASSO service, Audible Magic Corporation, BMAT Vericast, Midomi, Moodagent, SoundHound, Shazam, Broadcasting Airplay System, Last.fm, and Tunatic. Others include, but are not limited to, AudioID, Broadcasting Airplay System (BAS), Trax IT, YouTube's Content ID, AudioPrint, Gracenote's MusicID, MusicBrainz, AcoustID and Echoprint. All such algorithms mentioned explicitly in the present disclosure are incorporated herein by reference. Further, as noted, fingerprinting algorithms for other types of content (e.g., video, electronic books, and other content) are also considered as being within the scope of the present disclosure, and techniques described herein in connection with audio may be adapted to other types of content.

The fingerprint 108 may be information that digitally summarizes audio encoded by the audio file 102 in a deterministic manner. In other words, the fingerprint 108 may be information that is dependent on the audio signal from which the fingerprint 108 was determined. The algorithm may have various properties such as described above and in more detail below such as properties that cause the same fingerprint 108 to be generated regardless of minor changes to the audio file 102 and different types of encodings of the same audio signal or of similar audio signals, especially changes that insignificantly change the audio file 102 or that do not change the audio encoded by the audio file 102 such as changes to metadata of the audio file 102.

The fingerprint 108 output by the fingerprint calculator 106 may be provided to a music service 110. The music service 110 may be a music system operated to provide one or more services related to music. As an illustrative example, the music service may provide music streaming services to enable users to listen to music from their corresponding devices without having to have a persistently stored copy of that music on their devices. While such services are provided for the purpose of illustration, variations are considered as being within the scope of the present disclosure. For instance, techniques described herein are applicable to any type of service whose operation is dependent on fingerprints provided to the service, such as services whose level of access is dependent on the ability to provide fingerprints in accordance with the various techniques discussed herein.

Figure 2:
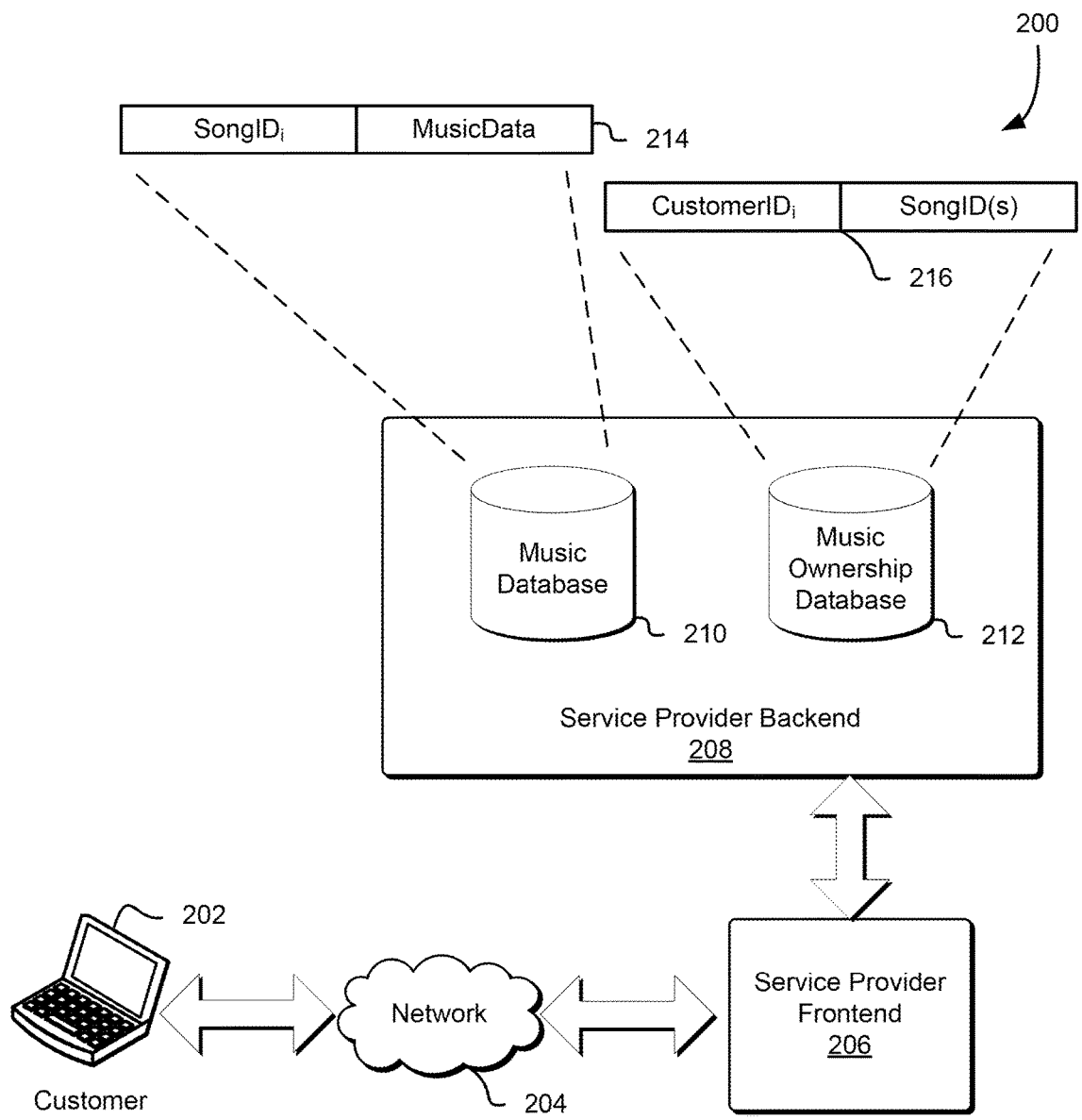
FIG. 2 shows an environment in which various embodiments can be implemented.

FIG. 2 shows an illustrative example of an environment 200 in which various embodiments may be practiced. As illustrated in FIG. 2 the environment 200 includes a customer 202 that communicates over a network 204 with a service provider front end 206. With reference to FIG. 2 and other figures of the present disclosure, the term "customer" is used interchangeably with a device used by a human customer. As such, a customer may also be referred to as a "client." The customer may communicate over the network to access a service provided by a service provider where the service provider operates the service provider front end 206. In FIG. 2 the customer 202 is illustrated as a laptop (notebook) computer, although other devices are also considered as being within the scope of the present disclosure including devices discussed below. Generally, any computing device operable to perform calculations in accordance with the various techniques described herein is considered as being within the scope of the present disclosure.

The network 204 may be any suitable network over which information may be transmitted between the customer 202 and the service provider front end 206. As an example, the network 204 may be the Internet. The network 204 also may be a combination of various different networks such as the Internet and one or more mobile communications networks. Generally, any network or combination of networks may be used to transmit data between customer 202 and the service provider front end 206. Further, it should also be noted that in some embodiments communication over a network is not necessary such as when the customer 202 and service provider front end 206 are directly connected to one another or when information is transferred in ways that don't include a network, such as by transferring a computer-readable storage medium from one computer to the other.

The service provider front end 206 may be a computer system operated by a service provider for the purpose of providing an interface to customers of a service provided by the service provider. As an illustrative example, the service provider front end 206 may be a webserver such as described below. It should be noted at the service provider front end 206 may also be a distributed computer system comprising multiple server computer systems that collectively operate to provide services of the service provider and, generally, that computer systems may be single devices or distributed systems. Information transmitted between the customer 202 and the service provider front end 206 includes, but is not limited to, fingerprints transmitted from the customer 202 to the service provider front end 206 and information provided as part of consumption of the services provided by the service provider such as requests from the customer 202 to access services of the service provider and information such as information encoding audio from the service provider to the customer 202.

To provide the various services of the service provider, the service provider may have an additional service provider back end 208 which may be a computer system (in many embodiments a distributed computer system) configured to provide services of the service provider and to employ various techniques described herein as part of providing the services. The service provider back end 208 may, for example, comprise one or more application servers such as described below. As part of providing its services to its customers, the service provider back end 208 may include various data stores that store information related to the services and its customers. As an illustrative example and as shown in FIG. 2, the service provider back end 208 may include a music database 210 and a music ownership database 212.

In an embodiment, the music database 210 associates audio recording with various data about those audio recordings including acoustic fingerprints for the audio recordings. Generally, the music database 210 contains information that is used in generating reference acoustic fingerprints. In the example shown in FIG. 2, the music database 210 may utilize a table schema 214 in which a column represents identifiers of songs (referred to in the drawing as SongID) and another column for the music data. The music data may be an encoding of an audio signal for a corresponding audio recording. The music data may be, for example, a music file. In some embodiments, the music data is in a format that is suitable for input into an algorithm that generates acoustic fingerprints, which may differ from a format in which the same recording is available in an electronic or other marketplace. For example, the music data for a recording may comprise a 16 kbps WAV file, whereas audio files encoding higher bitrates may be more commonly consumed. The music data may also include other information, such as metadata about the audio recording including metadata about an artist associated with the audio recording, publishing information about the audio recording, licensing information about the audio recording, and other information. It should be noted that the schema 214 and other schemas described herein are provided as examples, and other schemas and ways of storing data in association with other data are also considered as being within the scope of the present disclosure.

The service provider back end 208 may utilize the music database 210 to determine whether fingerprints provided by the customer 202 to the service provider front end 206 match. The service provider back end 208 may utilize the music database 210 to determine whether an acoustic fingerprint provided by the customer 202 to the service provider through the service provider front end 206 (a purported acoustic fingerprint which, when applying to embodiments that are not necessarily limited to audio, may generally be referred to as a purported robust digital fingerprint) is valid. A purported acoustic fingerprint may be valid on a condition that the fingerprint matches an acoustic fingerprint generated by the service provider back end 208 based at least in part on the music data for a respective audio recording.

The music ownership database 212 may be a database that enables the service provider to track ownership of recordings by its various customers. Generally, the music ownership database 212 may enable the service provider back end to track recordings that customers have proven possession of, such as by utilizing techniques described herein or in other ways such as by purchasing audio recordings from the service provider. It should be noted that the term "ownership," of content unless otherwise modified or clear from context, is intended to be broad, encompassing generally the right and/or ability to consume (e.g., listen to an audio recording and/or watch a video) the corresponding content and, in some embodiments, a right is not an exclusive right. For example, a customer may be said to "own" a particular recording if the customer has access to a copy of the recording, either locally, or in a remote storage location accessible to the customer. It should be noted, however, that the techniques described herein are applicable to embodiments where entities can prove exclusive ownership of a particular instance of content, such as when the techniques described herein are combined with digital rights management techniques, such as digital watermarks.

Returning to the illustrated example, the music ownership database 212 may be updated by the service provider back end 208 in various ways. For example, when a customer 202 proves, through various techniques described herein, possession of an audio recording, service provider back end 208 may update the music ownership database 212 accordingly. Similarly if the customer 202 purchases rights to an audio recording through an interface provided by service provider front end 206, the service provider back end 208 may update the music ownership database 212 as a result of the purchase and without the customer 202 having to separately prove possession of the audio recording.

As illustrated in FIG. 2 the music ownership database 212 may utilize a schema 216 that associates customers by customer identifiers with various recordings (files) for which the customers have proven possession. Each row in the music ownership database 212 may, for example, include a list of identifiers (SongIDs) of audio recordings for which the corresponding customer has proven ownership of or otherwise gained access to. As with the music database 210, the schema 216 is provided for the purpose of illustration and other schemas and ways of storing data in association with other data are also considered as being within the scope of the present disclosure. For a customer, the music database 210 may include identifiers for audio recordings for which customer has proven ownership. In some embodiments, a single identifier may correspond to multiple versions of the same recording (e.g., multiple encodings with different bitrates and/or in different formats) although the scope of the present disclosure includes embodiments where identifiers are used at a finer granularity (e.g., different identifiers for different bitrate encodings of the same audio signal).

Figure 3:
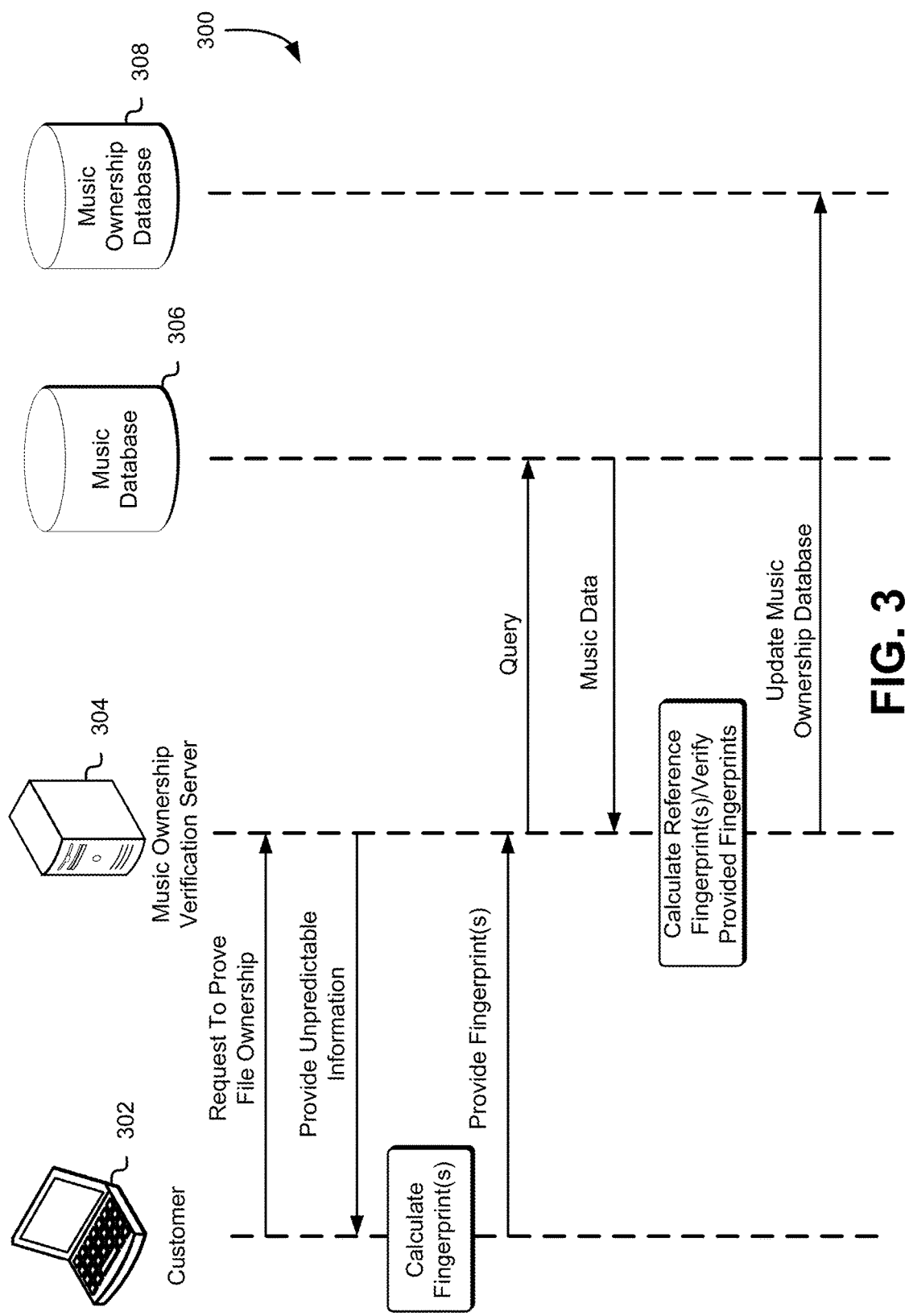
FIG. 3 shows a diagram illustrating communications between entities to enable proof of a set of audio files in accordance with an embodiment.

FIG. 3 shows an illustrative example of a diagram showing a flow of information in accordance with an embodiment. In this example, the flow of information involves a customer 302, a music ownership verification server 304, a music database 306, and a music ownership database 308. The customer 302 may be, for example, the customer 202 described above in connection with FIG. 2. The music ownership verification server 304 may be a server computer system operating as part of either the service provider front end 206 or the service provider back end 208 depending on the particular computing architecture in which a service provider has configured its systems. It should be noted that while FIG. 3 shows the customer 302 communicating directly with the music ownership verification server 304, such communications may be indirect such as when the music ownership verification server 304 is part of the service provider back end system and the customer 302 communicates through a server of a front end system of the service provider. The music database 306 and music ownership database 308 may be such as described above in connection with FIG. 2.

Turning to the specifics illustrated in FIG. 3, in an embodiment, the customer 302 transmits a request to prove file ownership to the music ownership verification server 304. The request may be transmitted 302 as part of a user's interaction with the interface provided by the music ownership verification server 304 where the interface may be, for example, a website or a mobile application. The request may be transmitted as a result, for example, of a user having indicated to the interface a desire to access one or more services of the service provider. The request may be transmitted in accordance with various protocols such as described above including, but not limited to, hypertext transfer protocol (HTTP).

In response to proof of file ownership the music ownership verification server 304 provides to the customer 302 unpredictable information. The unpredictable information may be information that the customer 302 is unable to deterministically determine until received from the music ownership verification server 304. As a result, the unpredictable information may be or otherwise comprise a random number generated by the music ownership verification server 304 or another computer system. Generally, the unpredictable information may be any information the customer 302 is unable to determine without having been provided the information. Other examples include values from a set of preselected values selected by the music ownership verification server 304 for other information. Further, in some embodiments, the customer 302 generates the unpredictable information itself. For example, the customer may execute code in a secure execution environment (e.g., a trusted platform module (TPM), an enclave of a Secure Guard Extensions (SGX)-enabled processor, or an ARM trust zone) and, as a result, generate unpredictable information (e.g., a random number) and information (e.g., a digitally signed certificate) that cryptographically proves that the code was executed in the secure execution environment. For example, a customer 302 or other system may execute code to generate the unpredictable information and use remote attestation to prove that the code was executed in an unmodified state. Proof may include other information, such as a timestamp, that can be verified and to which policy may be applied by a server verifying fingerprints (e.g., to determine that the generated fingerprint was generated in a sufficiently contemporaneous manner).

Using the unpredictable information, the customer 302 may calculate one or more fingerprints. In some examples, the customer 302 is requesting to prove file ownership for a batch of files. As an example, the customer 302 may communicate with the music ownership verification server 302 for the purpose of proving ownership of a library of audio recordings (e.g., a collection of mp3 files). The flow of information illustrated in FIG. 3, however, may also be performed for a single recording. Once the customer 302 has calculated the one or more fingerprints, the one or more fingerprints may then be provided by the customer 302 to the music ownership verification server 304.

The music ownership verification server 304 may query the music database 306 to obtain music data for the files associated with the one or more fingerprints provided by the customer 302. The music data may be or otherwise comprise, as discussed, encodings of audio such as MP3 files. The music database 306 may provide the music data in response to the query from the music ownership verification server 304. The music ownership verification server 304 may then use the music data and the unpredictable information provided to the customer 302 to calculate one or more reference fingerprints and may verify whether the one or more fingerprints provided by the customer 302 match the one or more calculated reference fingerprints calculated by the music ownership verification server 304.

After determining that the one or more fingerprints provided by the customer 302 match the one or more reference fingerprints calculated by the music ownership verification server 304, the music ownership verification server 304 may transmit one or more communications to the music ownership database 308 to cause the music ownership database 308 to indicate ownership of the recordings associated with the fingerprints provided by the customer 302.

Numerous variations are considered as being within the scope of the present disclosure. For instance, operations additional to those illustrated in FIG. 3 may be performed. In some embodiments, the music ownership verification server 304 or another server of the same distributed system requires authentication by the customer 302 before being allowed to prove ownership of music files and/or otherwise accessing services. Additionally, communications between the customer 302 and a service provider with the music ownership verification server 304 may be encrypted, such as by using a secure sockets layer (SSL) or transport layer security (TSL) connection. In some embodiments, if some but not all fingerprints provided by the customer 302 match the reference fingerprints calculated by the music ownership verification server 304, the music ownership database 308 may be updated only for those recordings associated with fingerprints that matched. As another example of a variation considered as being within the scope of the present disclosure, the music ownership verification server may query the music finger database 306 and begin calculation of the one or more reference fingerprints before the customer 302 provides the fingerprints. In this manner, the music ownership verification server 304 can more quickly determine if there is a match and whether the music ownership database 308 should be updated. As yet another example of variation considered as being within the scope of the present disclosure, operations performed by the music ownership verification server may be performed by different computer systems of a service provider. For example, the unpredictable information may be generated by and/or provided by a first server, and the reference fingerprints may be calculated by another server. Other variations are also considered as being within the scope of the present disclosure, including but not limited to, variations discussed above and below.

Figure 4:
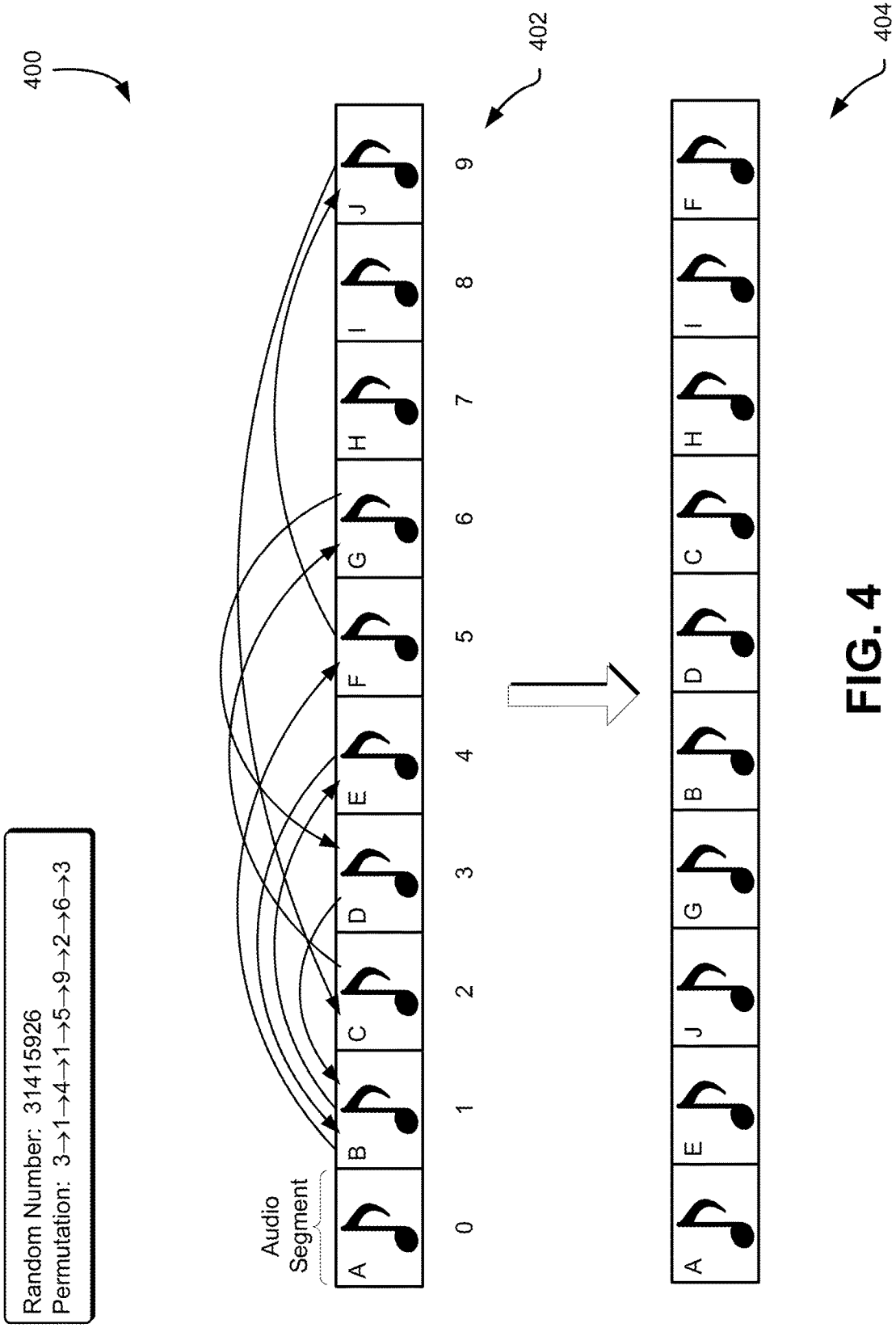
FIG. 4 shows an illustrative example of a permutation of a segmented audio file in accordance with an embodiment.

In various embodiments information unpredictable to a customer is used to modify an encoding of an audio signal to generate a fingerprint that corresponds to the information that is unpredictable. FIG. 4 shows a diagram illustrating one example of a way by which unpredictable information may be used to modify an encoding of an audio signal such as an encoding of an audio signal in an MP3 file. In the diagram 400 an encoded audio signal 402 is obtained. The encoding may be, for example, a 16 kbps WAV file or other encoding of an audio signal that is suitable for being input into an acoustic fingerprinting algorithm.

The encoded audio signal 402 may be segmented to create a plurality of audio segments. Each audio segment may correspond to a duration of the audio signal of a specified amount of time. For example, each audio segment may correspond to one second of the audio signal or a longer duration. In some embodiments, the length of each segment may depend on the length of the audio signal. For example, longer audio signals may have longer individual segments although, in some embodiments, segment size is not dependent from the length of the audio signal. In this example, the audio segments for the purpose of illustration are labeled A through J. The audio segments are also enumerated 0 through 9, representing an initial slotting of the audio segments in slots represented by the numerals 0 through 9.

In an embodiment, information unpredictable to a client is a random number. In this example, the random number is 31,415,926. The random number may be used to determine a permutation of the segment of the encoded audio signal 402. As noted, the numbers 0 through 9 in this example may be considered slots into which audio segments may be moved in and out of Thus the initial encoded audio signal 402 has the audio segment labeled A being in the 0 slot, the audio segment labeled B in the first slot (i.e., the slot labeled "1" and not the initial slot preceding all others), and audio segment labeled C in the second slot (labeled "2"), and so on. With the random number 31,415,926, the audio segment in the third slot is moved to the first slot, as indicated by the first digit of the random number being "3" and the next digit being "1." Generally, in this example, the first of two consecutive digits in the random number indicates an origin from which a segment is taken and the second of the consecutive digits indicates a destination slot to which the segment is moved. For the last digit representing the source slot, the destination is represented by the first digit. When a segment gets moved to a slot, the segment that was in that slot gets moved in accordance with the random number.

In this example, therefore, the audio segment labeled as D gets moved to the first slot. The audio segment in the first slot gets moved to the fourth slot (slot labeled "4"). In this example, the audio segment labeled B gets moved to the fourth slot. Continuing with the permutation, the audio segment in the fourth slot gets moved to the first slot. The audio segment in the first slot gets moved to the sixth slot. The audio segment in the fifth slot gets moved to the ninth slot. The audio segment in the ninth slot gets moved to the second slot. The audio segment in the second slot gets moved to the sixth slot. The audio segment in the sixth slot gets moved to the third slot, which completes the permutation in this particular example. As a result of performing this permutation, the audio segments are ordered as A, E, J, G, B, D, C, H, I, F. It should be noted that, because the random number did not include a 0, the audio segment in the zero-eth slot (slot labeled "0"), which is labeled A in this example, did not move and therefore remained in the zero-eth slot in the permuted encoded audio signal 404.

It should also be noted that FIG. 4 is provided for the purpose of illustration of one way a random number may be used to generate a permutation, and variations are considered as being within the scope of the present disclosure. Generally, any non-trivial mapping of information to a permutation may be used. For example, in some embodiments, encoded audio signals always have a uniform number of segments although, in other embodiments, encoded audio signals may have a number of segments that varies from one encoded audio signal to another (e.g., where the number of segments depends from the length of the encoded audio signal). The digits of a random number may be selected so as to account for there being more than 10 segments. As an illustrated example for numbers of audio segments up to 100, pairs of digits in the random number therefore may be used in the permutation.

In examples where the number of slots is less than the number of segments, various techniques may be used. For example, if there are 100 slots but an encoded audio signal only has 90 segments, 10 slots will remain empty after the permutation. The empty slots may be discarded and the remaining audio segments may be concatenated. As another example, the empty slots may simply be filled with an audio signal corresponding to silence or corresponding to a predetermined sound or signal for that segment. Other variations are also considered as being within the scope of the present disclosure, including other ways of generating permutations from random information.

In addition to the above, different modifications to an encoding of an audio signal may be used in addition to or instead of permutations. For example, information unpredictable to the client may be used to modify one or more characteristics of the encoding, such as bitrate, tone, and other characteristics of the encoding. The information unpredictable to the client may be used to indicate which portions (e.g., segments) of an encoding of an audio signal are to be modified and how the modifications are to be performed. Generally, the scope of the present disclosure extends to numerous embodiments where information unpredictable to a client is used to instruct the client how to modify an encoding of data in a way that results in a robust digital fingerprint, and such embodiments may or may not utilize permutations of segments of data.

Figure 5:
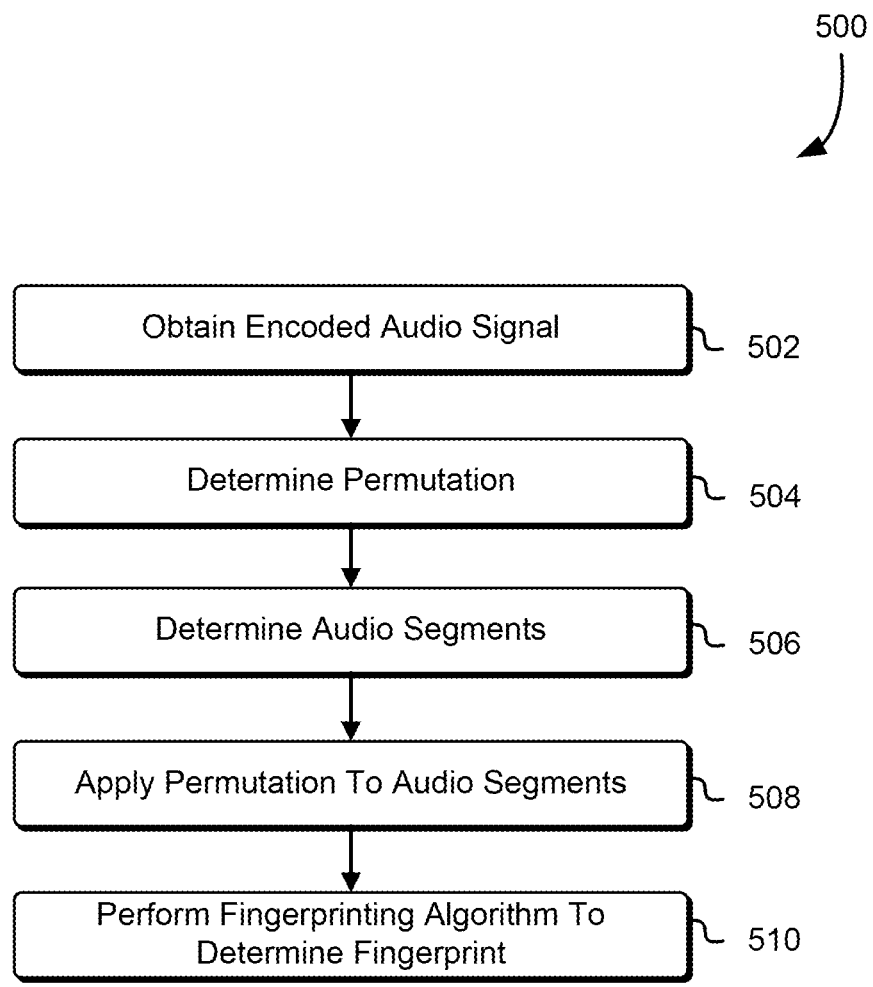
FIG. 5 shows an illustrative example of a process for generating an acoustic fingerprint in accordance with an embodiment.

FIG. 5 shows an illustrative example of a process for generating an acoustic fingerprint in accordance with an embodiment. The process 500 may be performed by any suitable system such as by a client computer system of a customer of a service provider to prove ownership of an audio recording or by a server of a service provider to generate a reference audio fingerprint for comparison with an acoustic fingerprint provided by the customer. In an embodiment the process 500 includes obtaining 502 an encoded audio signal. The encoded audio signal may be obtained in various ways in accordance with various embodiments. In some examples the encoded audio signal is a file obtained from local or remote data storage. Obtaining 502 the encoded audio signal may also include various operations dependent on a source of the encoded audio signal. For example, obtaining 502 the encoded audio signal may include translating information from one format to another. For example, information contained in an MP3 file may be converted to a WAV file, possibly with a different bitrate, for the purpose of performing the process 500. Further, the encoded audio signal may be obtained in a manner that results in an encoded audio signal that is usable by a fingerprinting algorithm to be utilized in performance of the process 500.

In an embodiment the process 500 includes determining 504 a permutation of the encoded audio signal. The permutation may be determined, for example, by generating, receiving, or otherwise obtaining random information such as described above and utilizing that random information to determine the permutation. Further, the process 500 may include determining audio segments from the encoded audio signal. In an embodiment, the encoded audio signal is segmented into audio segments of equal size except perhaps for a terminal audio segment if the length of the encoded audio signal is not exactly equal to an integer multiple of a uniform segment size. In some examples, the audio segments are of uniform size while in other embodiments the sizes of the audio segments may vary in accordance with various embodiments. In some embodiments information unpredictable to a customer is used to determine sizes of audio segments for segmentation of the encoded audio signal. Referring to FIG. 4, for example, digits obtained from the random number may be used to determine audio segment sizes. As one illustrative example, the first segment may have a size of three seconds, the second segment may have a size of one second, the third segment may have a size of four seconds, the fourth segment may have a size of one second, the fifth segment may have a size of five seconds, and so on. One random number may be used for determining a permutation while another random number may be used for segment size. Other variations are also considered as being within the scope of the present disclosure.

Returning to the particular embodiment illustrated in FIG. 5 the process 500 may include applying 508, a permutation to the audio segment such as described in above in connection with FIG. 4. As a result of applying 508 the permutation to the audio segment a permutated encoded audio signal is generated. A fingerprinting algorithm may then be performed 510 to determine an acoustic fingerprint of the permutated encoded audio signal which serves as a fingerprint of the encoded audio signal corresponding to the unpredictable information used to determine the permutation and/or otherwise used to determine how to transform the encoded audio signal.

Numerous additional variations of the process 500 are considered as being within the scope of the present disclosure including variations discussed above. In addition operations illustrated as being performed in a particular order as with all processes described herein unless otherwise clear from context may be performed in another order. For example, determination of the audio segments may occur before determination of the permutation.

Figure 6:
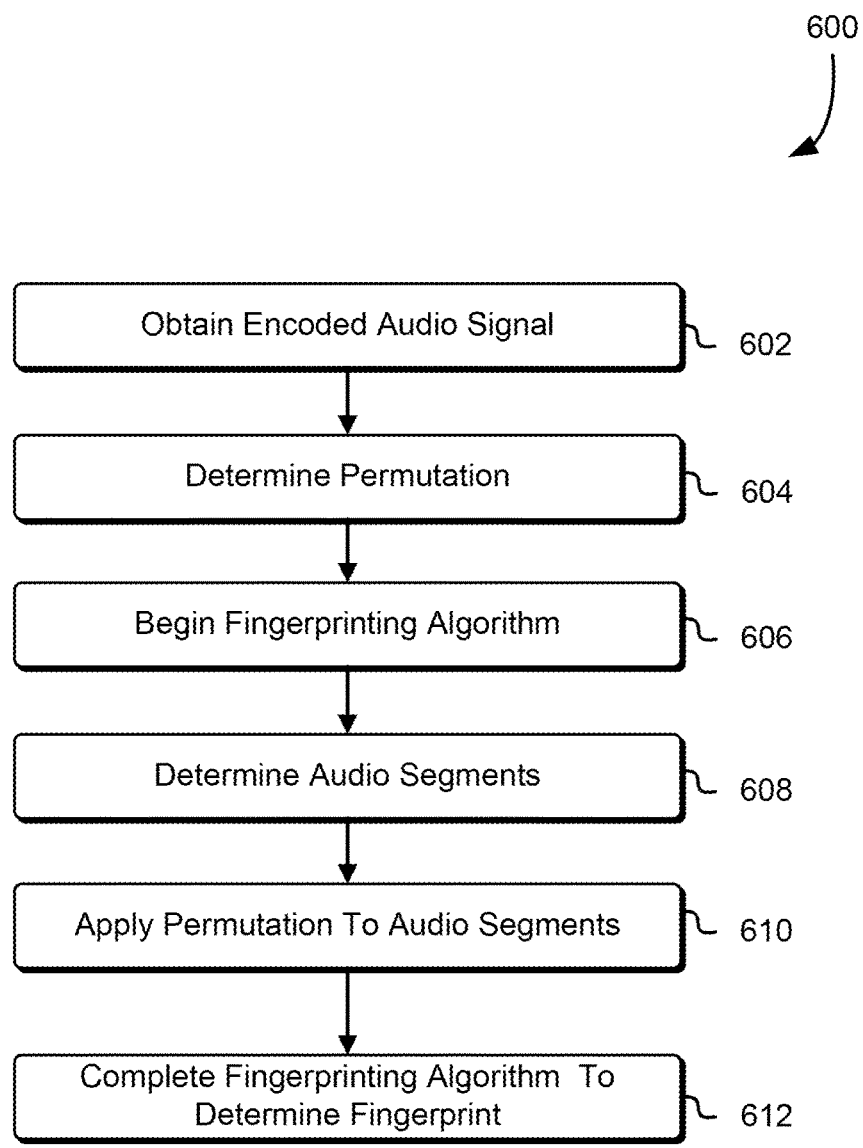
FIG. 6 shows an illustrative example of a process for generating an acoustic fingerprint in accordance with an embodiment.

FIG. 6 shows an illustrative example of a process for determining an acoustic fingerprint in accordance with an embodiment. In many respects the process 600 is similar to the process described above in FIG. 5 and accordingly may be performed by any suitable system, including systems discussed as able to perform the process 500 discussed above. As illustrated in FIG. 6 however techniques described above are more fully incorporated into an algorithm for determining an acoustic fingerprint. In particular, many acoustic fingerprinting algorithms segment encoded audio signal as part of their operation. The process 600 of FIG. 6 includes utilizing that segmentation in a way that provides advantages discussed above. In an embodiment the process 600 includes obtaining 602 an encoded audio signal such as described above in connection with FIG. 5. Further, a permutation may also be determined 604 such as described above. A fingerprinting algorithm may begin 606 and, as part of performance of the fingerprinting algorithm, the process 600 may include determining 608 audio segments.

The permutation that was determined 604 may be applied 610 to those audio segments, and the fingerprinting algorithm may be completed 612. In this manner performance of the process 600 provides at least a technical advantage of efficiency as the segmentation of the fingerprinting algorithm is used, thereby avoiding segmenting an encoded audio signal twice to determine an acoustic fingerprint. In other words, the fingerprint may be calculated without resegmenting the modified encoding of the audio signal.

Figure 7:
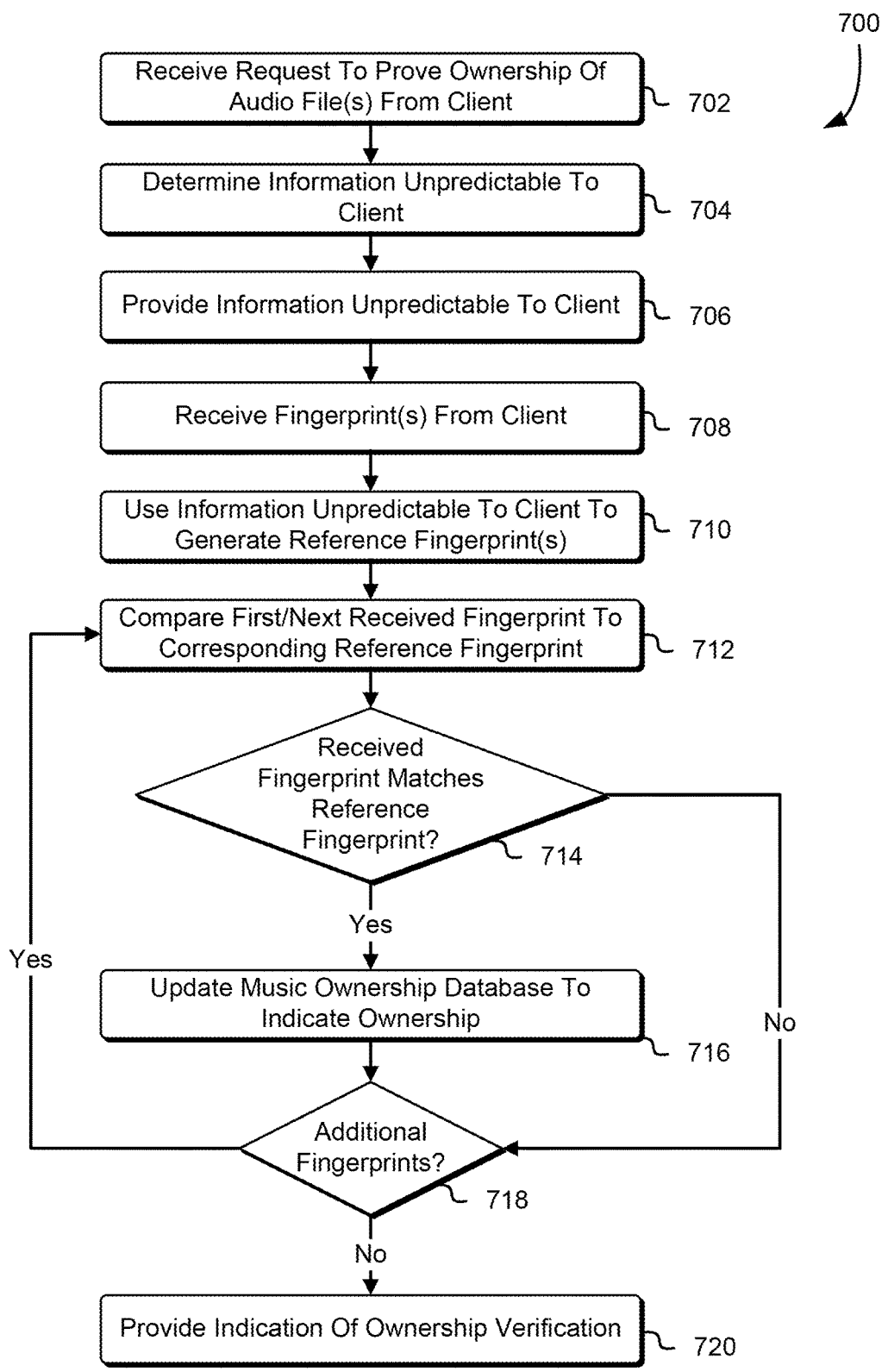
FIG. 7 shows an illustrative example of a process for verifying a set of acoustic fingerprints in accordance with an embodiment.

As noted above, various techniques described herein are usable by a service provider to obtain stronger assurances that customers purporting to have ownership of audio recordings actually do have such ownership. FIG. 7 shows an illustrative example of a process 700 for utilizing techniques described herein for providing a service and more specifically for updating a music ownership data base such as described above. The process 700 may be performed by any suitable system such as by a music ownership verification server such as described above in connection with FIG. 3 or any server of a service provider that the service provider has configured to perform this process. In an embodiment the process 700 includes receiving 702, a request to prove ownership of one or more audio files from a client. The client may be, for example, a computer system associated with a customer of a service provider which may operate in accordance with a client application such as a web browser or an application on a mobile device.

To respond to a request, a system performing the process 700 may determine 704 information unpredictable to the client. In some embodiments the information unpredictable to the client is a set of random numbers which may be a single random number or multiple random numbers. It should be noted that the information unpredictable to the client may be other information, such as described above. Determining the information unpredictable to the client may include generating the information unpredictable to the client and accessing the information unpredictable to the client from local or a remote data storage by contacting a service that provides such information or otherwise. In some embodiments, a different instance of information unpredictable to the client (e.g., a different random number) is determined for each recording the client is to prove ownership of, although the same information may be used for multiple different recordings.

The information unpredictable to the client may be provided 706 to the client to enable the client to generate an acoustic fingerprint for each audio recording for which the client has requested to prove ownership. Accordingly, the process 700 may include receiving 708 one or more acoustic fingerprints from the client. The one or more acoustic fingerprints may be received 708 in one or more claims of possession from the client, where a claim of possession may be a structured collection of information that specifies an acoustic fingerprint and an identifier for an audio signal purportedly corresponding to the acoustic fingerprint. The acoustic fingerprints may be received, for example, over a network in the same manner by which the request was received 702. The information unpredictable to the client may be used 710 to generate a set of reference fingerprints for checking one or more fingerprints received 708 from the client. It should be noted that, while FIG. 7 shows the information unpredictable to the client being used 710 to generate a set of reference fingerprints after having received 708 one or more fingerprints from the client, the system performing the process 700 may use the information unpredictable to the client to generate the set of reference fingerprints at an earlier time. In some embodiments the system performing the process 700 or another system generates the set of reference fingerprints using the information unpredictable to the client before the request is received 702 from the client. For example, random numbers may be pre-generated and used to regenerate acoustic fingerprints for the random numbers and the acoustic fingerprints may be stored.

Returning to the embodiment illustrated in FIG. 7, the process 700 may include comparing 712 the first received fingerprint to its corresponding reference fingerprint. The comparison may be made, for example, by determining whether the fingerprint received from the client matches the corresponding reference fingerprint by being equal to the corresponding reference fingerprint. It should be noted, however, that a reference fingerprint may match another acoustic fingerprint without necessarily being equal to the other acoustic fingerprint. A determination may be made 714 whether the received fingerprint matches the reference fingerprint. If it is determined 714 that the received fingerprint matches the reference fingerprint, the process 700 may include updating 716 a music ownership data base to indicate such ownership. One or more records corresponding to the client may, for example, be updated to indicate ownership.

If however it is determined 714 that the received fingerprint does not match the referenced fingerprint, the process 700 may include determining 718 whether there are additional fingerprints to check. If it is determined 718 that there are additional fingerprints to check, the process 700 may include comparing the next received fingerprint to its corresponding reference fingerprint determining whether the received fingerprint matches its corresponding reference fingerprint and updating or not updating the music ownership database accordingly. This process may repeat until it is determined 718 that there are no additional fingerprints. At this time, an indication of ownership verification may be provided 720 to the client. The indication of ownership verification may include information that indicates to the client how performance of the process 700 was completed. For example, if all acoustic fingerprints matched, the indication of ownership verification may indicate such a match. If one or more fingerprints provided by the client did not match the indication of ownership, verification may indicate recordings for which fingerprints did not match and may enable the client to perform corresponding operations such as by providing fingerprints again or otherwise proceeding.

As with all processes described herein, variations are considered as being within the scope of the present disclosure. For example, FIG. 7 shows a process by which a set of fingerprints are sequentially checked. A variation of the process 700 includes a variation where some or all verifications are performed in parallel by other systems. For example, for a large set of acoustic fingerprints, subsets of a set of acoustic fingerprints may be set to different computer systems to enable the other computer systems to verify whether the acoustic fingerprints provided by the client are valid. As noted above, a service provider may also pre-generate acoustic fingerprints for audio files before a request to prove ownership is received.

Other variations are also considered as being within the scope of the present disclosure including variations where the techniques described herein are used with other techniques such as authentication. For example, in some embodiments, information unpredictable to the client is additionally used for authentication as well as proof of ownership. A user may, for example, have information corresponding to the user and information unpredictable to the client may be presented to the user in a manner that enables the user to demonstrate possession of the information corresponding to the user. The information unpredictable to the client may, for example, be used to instruct the user which portions of the information corresponding to the user to provide back (via user input into a user device). Such information may be maintained as a secret shared between the customer and the service provider. As an illustrative example, a user may have a set of information that is unique to the user or that is not shared among a large number of users. The information may be, for example, a grid of numbers, letters, or other information (e.g., pictures). Information unpredictable to the client may be used to generate a set of coordinates for which the user is to select corresponding values and/or an order of selection. A user may provide to his or her corresponding computer system through user input the corresponding values in order to prove the user's identity. A user without instructions corresponding to the information unpredictable to the client would not, other than by chance, be able to provide the information back to the server in a proper form. The server can use the same instructions to generate reference information that can be compared with that which was provided by the user. Generally, information unpredictable to the client in addition to being used to determine how to transfer an encoded audio signal may be used to indicate to a user's computer system how to authenticate.

Other variations are also considered as being within the scope of the present disclosure. For instance, as noted, while audio is used throughout for the purpose of illustration, the techniques discussed above are adaptable to other encodings of information. Techniques for generating acoustic fingerprints may be adapted to, for example, general robust digital fingerprints (of which acoustic fingerprints are an example). A robust digital fingerprint may be a digest of an instance of content (e.g., audio, video, text and or other types of content and combinations of types of content, which is not necessarily media content renderable for human consumption) calculated using an algorithm having the properties that performance of the algorithm on different digital representations of an instance of content result in the same calculated robust digital fingerprint and that performance of the algorithm on different instances of content result in different robust digital fingerprints. For example, a property of a robust digital fingerprint may be that there is a first set of changes to the digital representation of the instance of content that, if made, would result in the same reference robust digital fingerprint and such that there is a second set of changes to the digital representation that, if made, would result in a different robust digital fingerprint. With acoustic fingerprints, for instance, there is a set of bitrates of an audio recording that result in the same acoustic fingerprint, but reducing the bitrate too much may result in a different acoustic fingerprint. With video files, there may be ranges of audio resolution and video resolution within which an algorithm for calculating a robust digital fingerprint results in the same calculated robust digital fingerprint. A robust digital fingerprint may have other properties, such as the inability to obtain an instance of content from its robust digital fingerprint.

Figure 8:
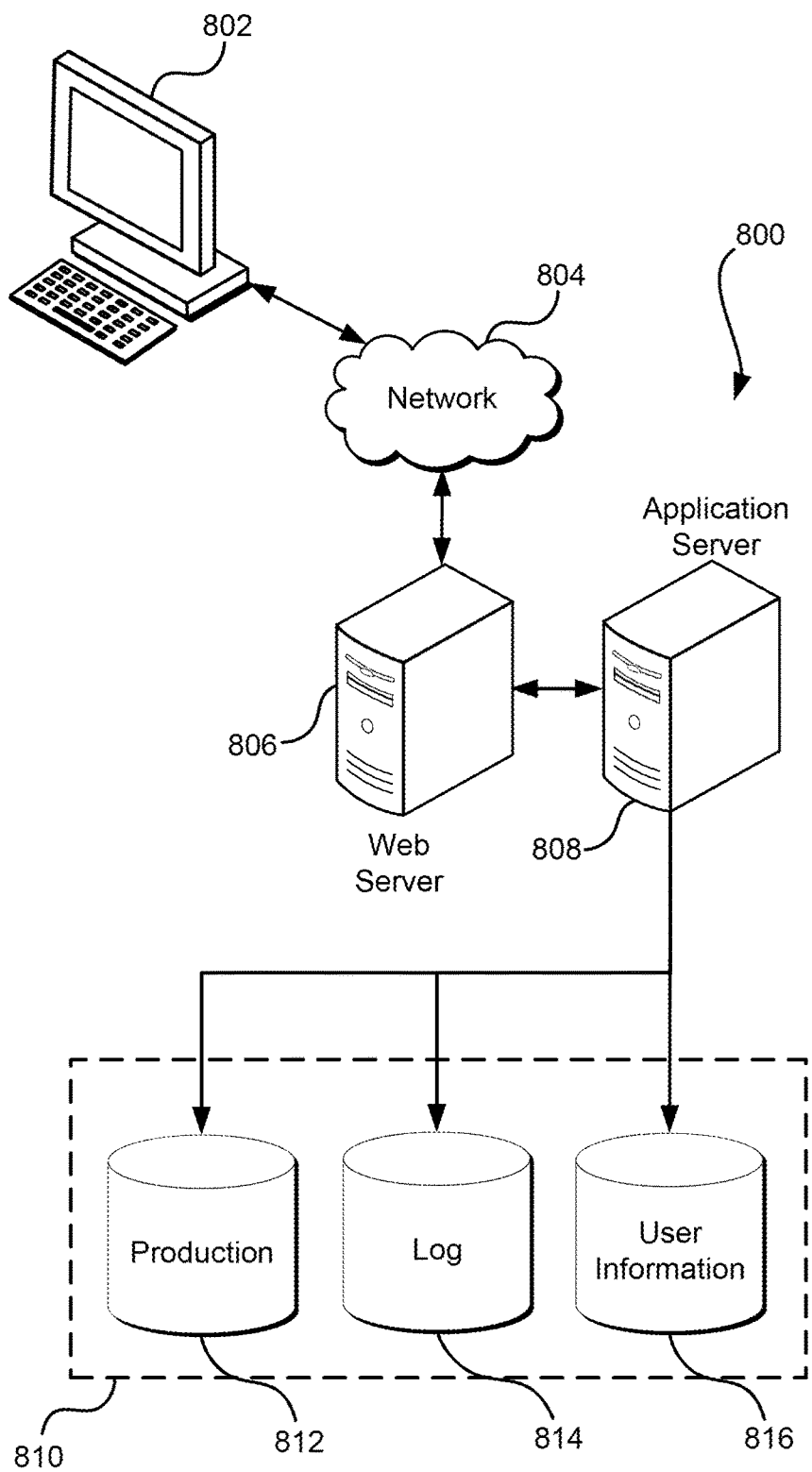
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining random information;
   providing the random information to a client computer system;
   receiving, from the client computer system, an acoustic fingerprint;
   obtaining an encoding of an audio signal;
   segmenting the encoding of the audio signal to obtain an ordered set of audio segments, the ordered set of audio segments comprising an audio segment with a size determined based at least in part on a first portion of the random information;
   permuting, based at least in part on a second portion of the random information, the ordered set of audio segments to obtain a permuted set of audio segments;
   generating, based at least in part on the permuted set of audio segments, a reference acoustic fingerprint;
   verifying that the random information was used to generate the received acoustic fingerprint by at least determining that the generated reference acoustic fingerprint matches the received acoustic fingerprint; and
   providing, to the client computer system, authorization to access a service based on the verifying that the random information was used to generate the received acoustic fingerprint.

2. The computer-implemented method of claim 1, wherein generating the reference acoustic fingerprint includes using an acoustic fingerprint algorithm having a property that, the acoustic fingerprint algorithm performed on different digital encodings of an audio signal results in the same acoustic fingerprint.

3. The computer-implemented method of claim 1, wherein:
   the method further comprises:
   receiving, from the client computer system, a request to access the service; and
   obtaining the random information includes generating the random information as a result of receiving the request.

4. The computer-implemented method of claim 1, wherein:
   the permuted set of audio segments corresponds to a transformed audio signal; and
   generating the reference acoustic fingerprint is performed without resegmenting the transformed audio signal.

5. A system, comprising:
   at least one computing device configured to implement one or more services, wherein each of the one or more services:
   obtains random information;
   receives, from another system, a purported robust digital fingerprint;
   uses the random information to modify a digital representation of an instance of audio content by at least:
      determining a set of segments of the digital representation such that a segment in the set of segments has a size determined based at least in part on a first portion of the random information; and
      permuting the set of segments based at least in part on a second portion of the random information;
   calculates, based at least in part on the modified digital representation of the instance of audio content, a reference robust digital fingerprint;
   verifies that the purported robust digital fingerprint was generated using the random information by at least determining that the reference robust digital fingerprint matches the received purported robust digital fingerprint; and
   performs one or more operations corresponding to the received robust digital fingerprint matching the reference robust digital fingerprint, wherein the one or more operations include providing authorization to access the one or more services.

6. The system of claim 5, wherein the robust digital fingerprint is an acoustic fingerprint and the digital representation of the instance of audio content is an encoding of an audio signal.

7. The system of claim 5, wherein the random information is a random number generated by a system different from the other system.

8. The system of claim 5, wherein the one or more operations corresponding to the received robust digital fingerprint matching the reference robust digital fingerprint include enabling access to a service that allows the other system to access the audio content using a device that lacks a locally stored copy of the audio content.

9. The system of claim 5, wherein each of the one or more services modifies the digital representation of the instance of audio content by:
segmenting the digital representation of the instance of audio content to obtain an ordered set of segments; and
generating, based at least in part on the random information, a permutation of the ordered set of segments to obtain a transformed digital representation of the instance of audio content.

10. The system of claim 5, wherein each of the one or more services calculates the reference robust digital fingerprint using an algorithm applied to the digital representation of the instance of audio content, the algorithm being configured such that there is a first set of changes to the digital representation of the instance of audio content that, if made, would result in the same reference robust digital fingerprint and such that there is a second set of changes to the digital representation that, if made, would result in a different robust digital fingerprint.

11. The system of claim 5, wherein the purported robust digital fingerprint matching the reference robust digital fingerprint requires the purported robust digital fingerprint to equal the reference robust digital fingerprint.

12. The system of claim 5, wherein the one or more services are configured to calculate the reference robust digital fingerprint using an algorithm that includes segmenting the modified digital representation of the instance of audio content.

13. A non-transitory computer-readable storage medium having stored thereon executable instructions that, when executed by one or more processors of a computer system, cause the computer system to at least:
obtain random information;
use the received random information to modify a digital representation of an instance of audio content by at least:
determining a set of segments of the digital representation such that a segment in the set of segments has a size determined based at least in part on a first portion of the random information; and
permuting the set of segments based at least in part on a second portion of the random information;
calculate, based at least in part on the modified digital representation of the instance of audio content, a robust digital fingerprint;
provide, to another computer system, a claim of possession of the audio content, the claim based at least in part on the robust digital fingerprint and enabling the other computer system to verify that the random information was used to calculate the robust digital fingerprint;
receive a verification, from the other compute system, based on the claim of possession; and
gain an access to or more services based on the verification.

14. The non-transitory computer-readable storage medium of claim 13, wherein the digital representation of the instance of audio content is an encoding of an audio signal.

15. The non-transitory computer-readable storage medium of claim 13, wherein the instructions that cause the computer system to obtain the random information, if executed by the one or more processors, cause the computer system to receive the random information from the other system.

16. The non-transitory computer-readable storage medium of claim 13, wherein the random information comprises a random number.

17. The non-transitory computer-readable storage medium of claim 13, wherein the instructions that cause the computer system to use the received random information to modify the digital representation of the instance of audio content, if executed by the one or more processors, cause the computer system to permute segments of the digital representation of the instance of audio content.

18. The non-transitory computer-readable storage medium of claim 13, wherein:
the instructions that cause the computer system to use the received random information to modify the digital representation of the instance of audio content, if executed by the one or more processors, cause the computer system to segment the digital representation of the instance of audio content; and
the instructions that cause the computer system to calculate the robust digital fingerprint, if executed by the one or more processors, cause the computer system to calculate the robust digital fingerprint without resegmenting the digital representation of the instance of audio content.

19. The non-transitory computer-readable storage medium of claim 13, wherein the random information is obtained in response to a request to access a service.

20. The non-transitory computer-readable storage medium of claim 13, wherein the claim includes an authentication claim generated based at least in part on the random information.

* * * * *